United States Patent Office 3,208,956
Patented Sept. 28, 1965

3,208,956
NOVEL POLYURETHANE COMPOSITIONS AND METHOD OF PREPARING SAME
Raymond R. Hindersinn, Lewiston, and Michael Worsley, Niagara Falls, N.Y., assignors to Hooker Chemical Corporation, Niagara Falls, N.Y., a corporation of New York
No Drawing. Filed Dec. 16, 1960, Ser. No. 76,122
22 Claims. (Cl. 260—2.5)

This invention relates to polyurethane compositions and to processes for producing them. The invention further relates to novel polyurethane foamable compositions and foam products, and to processes for producing them.

The compositions of the present invention are useful in the preparation of highly fire-resistant foamed or cellular plastic products. The compositions of the invention are further useful in the preparation of adhesives, binders, laminates, coatings and potting compounds.

The polyurethane foams have found wide and varied used in industry. For instance, they may be used as core materials between skins of many and varied compositions. In aircraft construction, the foam may be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property; they develop a high degree of adhesion during the foaming process. As a result they will adhere to skins composed of such varied materials as metals, plastics, ceramics, and glass. The resulting sandwich-type assemblies lend themselves well for use in such diverse fields as in the construction and insulation industries.

The rigid plastic foams can be utilized without skins as insultating materials to surround hot water or steam pipes and valves. Their utility for such applications is enhanced by their ability to be applied, foamed, and used in situ.

The rigid plastic foams have many desirable properties. They have great structural strength coupled with low density. In sandwich-type constructions, they exhibit a high degree of rigidity, a property particularly desirable for building purposes. They are excellent vibration dampers and may thus support highly resonant loads. Because of their fine cell structure they are excellent heat and sound insulators. The foam cells may be made very fine and uniform, so that the cells are tough and non-brittle and hence, highly resistant to rupturing.

Many of the polyurethane compositions and foams of the prior art have the disadvantage of being flammable. This disadvantage prevents the use of these materials in many applications. This problem is overcome by the compositions disclosed and claimed in United States Patent 2,865,869. Fire resistance is imparted to these polyurethane compositions by incorporating therein polycarboxylic adducts of hexahalocyclopentadiene. The mechanical handling of the compositions disclosed in this patent has not been entirely satisfactory because the incorporation of halogen-containing compounds into the polyester portion of the composition causes an increase in viscosity, and when the halogen content is greater than fifteen percent, solid alkyds result. Such solid polyester alkyds are difficult to handle for the production of polyurethane foams, adhesives, coatings and the like.

It has been previously found that plasticizers such as tricresyl phosphate or a mixture of methyl pentachlorostearate and epoxized soybean oil can be advantageously added to such solid alkyds to lower their viscosity and permit easier handling. However, such materials plasticize the finished foam and adversely affect the physical properties of the foams containing them. The principal disadvantage in using such plasticizers is the reduction in the strength of the foam at elevated temperatures.

It is an object of the present invention to provide polyurethane compositions for use in the production of fire-resistant foams. It is another object of this invention to provide polyurethane compositions for use in the production of foams having high strength and water resistance. Another object is to provide polyurethane foams that are strong, fire-resistant, and resistant to the deleterious effects of water at elevated temperatures. Still another object is to provide polyurethane compositions that are useful in preparing adhesives, fibers, laminates, coatings, and potting compounds. Another object is to provide a process for readily preparing such compositions and foams.

In accordance with this invention, it is found that the handling characteristics of polyurethane compositions can be improved without adversely affecting the ultimate physical properties, by employing low viscosity liquids containing groups capable of reacting with an isocyanate during the preparation of the composition. In this manner the liquid additives are incorporated into the finished foam by chemical reaction.

Such low viscosity liquids include hydroxyl-containing compounds having at least two hydroxyl groups per molecule, and preferably having at least three hydroxyl groups per molecule. Thus, it is within the scope of this invention to use compounds such as ethylene glycol, propylene glycol, diethylene glycol, dipropylene glycol, triethylene glycol, butanediol, and pentanediol. The preferred class of compounds includes glycerol, 1,2,6-hexanetriol, triisopropylated glycerol, triisopropylated sucrose, and numerous low molecular weight polyesters such as the reaction product of trimethylol propane and adipic acid and low molecular weight polyesters such as the reaction product of polyhydric compounds and alkylene oxides. Suitable polyethers are the reaction product of trimethylol propane and ethylene or propylene oxide, and the reaction product of a phenol-aldehyde polymer and ethylene or propylene oxide. Thus, it is seen that a wide variety of materials can be used, but it is preferred that the viscosity of the liquid additive be less than one hunderd Gardner seconds at fifty degrees centigrade.

All of the liquid additives contemplated in the present invention can be used in amounts up to twenty-five weight percent of the polyester or polyether alkyd of the polyurethane composition. Even higher levels, up to fifty percent, can be used in the case of the low molecular weight polyesters and polyethers. Such polyesters and polyethers are generally prepared so that their hydroxyl numbers are in the range two hundred to nine hundred and fifty.

It is found that if liquid additives containing three hydroxyl groups per molecule are employed in the present invention, the polyurethane compositions retain substantially all of their strength at elevated temperatures, thus providing an additional advantage for using this class of compounds.

In accordance with the present invention, it is found that polyurethane compositions may be produced by utilizing a mixture comprising (A) an alkyd resin selected from the group of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof; (B) a hydroxyl-containing compound having at least two hydroxyl groups per molecule; and (C) an organic polyisocyanate. Foamable compositions are prepared by adding to this mixture a fourth component, (D) a foaming agent.

Among the adducts of hexahalocyclopentadiene and polycarboxylic compounds which may be used in the preparation of the alkyd of this invention are:

1,4,5,6,7,7-hexachlorobicyclo-(2.2.1)-5-heptene-2,3-dicarboxylic acid;
1,4,5,6,7,7-hexabromobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methylbicyclo-(2.2.1)-5-heptene-2,3-dicarboxylic anhydride;
the mono- or dimethyl ester of 1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride; and
1,4,5,6,7,7-hexachlorobicyclo-(2.2.1)-5-heptene-2,3-dicarbonyl chloride which is the adduct of hexachlorocyclopentadiene with fumaryl chloride.

Among the adducts of hexahalocyclopentadiene and polyhydric alcohols which may be used in the preparation of the alkyd of this invention are:

2,3-dimethylol-1,4,5,6,7,7-hexachlorobicyclo-(2.2.1)-5-heptene; and
3-(1,4,5,6,7,7-hexachlorobicyclo-(2.2.1)-5-heptene-2-yl)-methoxy-1,2-propanediol;
2,3-dimethylol-1,4,5,6-tetrachloro-7,7-difluorobicyclo-(2.2.1)-5-heptene;
2,3-dimethylol-1,4,5,6,7,7-hexabromobicyclo-(2.2.1)-5-heptene;
3-(1,4,5,6-tetrachloro-7,7-difluorobicyclo-(2.2.1)-5-heptene-2-yl)-methoxy-1,2-propane diol.

These compounds and the method of preparation are disclosed in co-pending application S.N. 308,922 for "Poly-Halogen-Containing Polyhydric Compounds," filed September 10, 1952, now U.S. Patent 3,007,958.

It is generally desirable that at least a portion of the total polyhydric alcohol component (b) consist of three hydroxyl groups in order to provide a means for branching the alkyd. The entire alcohol component may be made up of a trifunctional alcohol, such as glycerol, or a difunctional polyhydric alcohol may be utilized as a part of the polyhydric alcohol component. Illustrative of polyhydric alcohols which may be used are the following: ethylene glycol; 1,4-butanediol; diethylene glycol; propylene glycol; glycerol; hexanetriol; butanetriol; trimethylol propane; trimethylol ethane; pentaerythritol, and the like.

A large number of various organic polyisocyanates may be used. The aromatic polyisocyanates are more reactive and less toxic than the aliphatic members. Consequently, the aromatic ones are preferred in the present invention. The preferred compounds which are at present most readily available commercially are 2,4-tolylene diisocyanate; 2,6-tolylene diisocyanate and mixtures thereof. However, others may be used, among them 4,4'-methylene-bis(phenyl isocyanate); 3,3'-bitolylene-4,4'-diisocyanate; 3,3'-dimethoxy-4,4'-biphenylene diisocyanate; 1,5-naphthyl diisocyanate, and the like. Furthermore, mixtures of polyisocyanates may be used.

The polyisocyanate concentration may be varied over a wide range, for example from about thirty to about two hundred percent of isocyanate groups based on the number of hydroxyl and carboxyl groups in the alkyd (and foaming agent, when one is used); the preferred range is ninety to one hundred and ten percent.

A proportion of an aliphatic acid may be incorporated into the composition. Adipic acid is generally preferred for this purpose, although other suitable acids may be used such as oxalic, malonic, succinic, glutaric, pimelic, suberic, azelaic, sebacic, etc. For certain purposes unsaturated acids such as maleic, citraconic, itaconic, etc., may be used.

When the polyurethane compositions of the present invention are foamed, any foaming agent may be employed that is capable of liberating gaseous products when heated or when reacted with an isocyanate. One foaming system which is especially suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents may be employed.

Preferably, the polyurethane compositions of the present invention may be foamed without a reactive foaming agent. This is usually done by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centrigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

The polyurethane compositions of the present invention may, if desired, be stored at low temperatures and foamed thereafter.

In our co-pending patent application S.N. 853,689, filed November 18, 1959, now Patent No. 3,055,850, there are disclosed polyurethane compositions wherein all or a portion of the adduct of hexahalocyclopentadiene is reacted with a polyisocyanate to form a prepolymer and the remainder of the halogenated compound can be used in the preparation of the alkyd. Foamable compositions prepared in accordance with that invention are much easier to handle than the aforementioned solid alkyd system, because the alkyd portion of the composition remains liquid. It is within the scope of the present invention to use the low viscosity liquids of the present invention in the compositions of the above-mentioned application to modify the viscosity of said system and improve the processibility thereof.

The following examples are set forth to further illustrate the teachings of this invention, but are not intended to limit the invention in any manner.

EXAMPLE 1

An alkyd resin was prepared by heating together four moles of 1,4,5,6,7,7-hexachlorobicyclo-(2.2.1)-5-heptene-2,3-dicarboxylic acid, two moles of adipic acid and 7.6 moles of glycerol to produce a polymer having an acid number of five and a hydroxyl number of two hundred and sixty-five. To a hot mixture of 40.0 grams of this alkyd, 0.2 gram of Emulphor EL-719 (a polyoxyethylated vegetable oil, marketed by Antara Chemical Company), and 4.0 grams of glycerol at one hundred and twelve degrees centigrade, was added 34.4 grams of toluene diisocyanate. The mixture was stirred rapidly with a thermometer for one minute until all components were compatible. The clear solution was then cooled to fifty-four degrees centigrade with continued stirring. A solution of six drops of concentrated sulfuric acid and 4.4 cc. of tertiary amyl alcohol was then added, and stirring was continued at fifty to fifty-five degrees centigrade for an additional five minutes. The resulting mixture was then heated with stirring on a hot plate to eighty degrees centigrade, and poured into a container. The material was expanded and cured by heating at one hundred and twenty degrees centigrade for one hour. The finished foam had a density of 2.0 pounds per cubic foot, had a fine cell structure and a compressive strength of twenty-eight p.s.i. at room temperature, and twenty-five p.s.i. at one hundred and twenty degrees centigrade.

EXAMPLE 2

Another foam was prepared using a procedure similar to that of Example 1. The components of this foam consisted of 40.0 grams of the alkyd prepared in Example 1, 32.4 grams of toluene diisocyanate, 0.3 gram of Emulphor EL-719, six drops of concentrated sulfuric acid and 4.4 cc. of tertiary amyl alcohol, and eight grams of isopropylated glycerine (Hyprin GP, manufactured by Dow Chemical Company). The isocyanate was added to the alkyd mixture at one hundred degrees centigrade and cooled to fifty degrees centigrade. Following the addition of the acid and alcohol, the mixture was stirred for an additional ten minutes at fifty degrees centigrade. All other conditions were the same as in Example 1. The resulting foam had a density of 2.3 pounds per cubic foot and a compressive strength of twenty p.s.i. at room temperature, and twenty-one p.s.i. at one hundred and twenty degrees centigrade.

EXAMPLE 3

Another foam was prepared in accordance with the procedure of Example 1, except that 46.2 grams of toluene diisocyanate was used, and the liquid additive consisted of a mixture of 6.0 grams of glycerol and 2.0 grams of isopropylated glycerol. The alkyd was initially at ninety-nine degrees centigrade, and after being mixed with the isocyanate was cooled to sixty degrees centigrade. After all the components were mixed, the mixture was stirred for an additional nine minutes. All other conditions were the same as in Example 1. The resulting foam had a density of 2.4 pounds per cubic foot and a compressive strength of thirty-one p.s.i. at room temperature, and twenty-six p.s.i. at one hundred and twenty degrees centigrade.

EXAMPLE 4

Another foam was prepared according to the procedure of Example 1, except that the glycerol was replaced with a mixture of methyl pentachlorostearate and epoxidized soybean oil. The resulting foam had only about fifty percent of its room temperature strength at one hundred and twenty degrees centigrade.

The preceding examples indicated that composition containing glycerol and isopropylated glycerol were easier to handle at low temperatures, and retained their strength at elevated temperatures, whereas a foam prepared with the plasticizer of the prior art had a greatly reduced strength at elevated temperatures.

EXAMPLE 5

A prepolymer was prepared by heating twenty-five parts of the alkyd of Example 1, containing 16.6 weight percent of a mixture of methyl pentachlorostearate and soybean oil as a diluent, at one hundred and ten degrees centigrade, to seventy-five parts of toluene diisocyanate at one hundred and twenty degrees centigrade, with rapid stirring, maintaining the temperature at one hundred and twenty degrees centigrade for fifteen minutes and then cooling to room temperature. A mixture of 1260 grams of the alkyd prepared in Example 1, 84.0 grams of glycerol, and 16.5 grams of Emulphor EL-719, at one hundred and twenty degrees centigrade, was stirred until the temperature had dropped to ninety degrees centigrade. Then 1420 grams of the prepolymer described above was added, and mixing continued for 1.5 minutes. A solution of three cc. of concentrated sulfuric acid dissolved in thirty cc. of tertiary amyl alcohol was added and rapidly mixed for one minute. The composition was poured into a mold, and cured at one hundred and twenty degrees centigrade for one hour. The foam had an excellent cell structure, and a density of 8.8 pounds per cubic foot.

EXAMPLE 6

Another foam was prepared using 628 grams of the alkyd of Example 1, 62.8 grams of glycerol, 540 grams of toluene diisocyanate, sixty-nine cc. of tertiary amyl alcohol, 3.6 cc. of concentrated sulfuric acid, and 4.7 grams of Emulphor EL-719. In this case, the toluene diisocyanate was added in two parts to the alkyd mixture which was at one hundred and twenty degrees centigrade, and the resulting mixture was cooled to eighty degrees centigrade, poured after 3.5 minutes of mixing. The resulting foam had a uniform fine cell structure and a density of 1.7 pounds per cubic foot.

In the following table, the compressive strength of the foams prepared in Examples 5 and 6 are compared with the strength of commercially available foams at various temperatures.

*Table*

| | Foam Density (lbs. per cubic foot) | Comp. Strength at room Temp., p.s.i. | Percent of Room Temperature Strength at— | | | | |
|---|---|---|---|---|---|---|---|
| | | | 80° C. | 100° C. | 120° C. | 140° C. | 160° C. |
| Example 6 | 1.7 | 20.2 | 100 | 94 | 91 | | |
| Example 5 | 8.8 | 224.4 | | | 92 | 83 | 69 |
| Commercial Foam A | 9 | 230 | | | 37 | | |
| Commercial Foam B | 9 | 250 | | | 40 | | |
| Commercial Foam C | 7 | 150 | | | 80 | | 57 |
| Commercial Foam D | 10.5 | 260 | | | 73 | | 69 |

It can be seen that the foams prepared in accordance with the present invention retained more of their strength at one hundred and twenty degrees centigrade than any of the commercial foams.

The following examples illustrate the use of polyesters and polyethers as the additive of the present invention.

EXAMPLE 7

(A) A polyether having a hydroxyl number of three hundred and ninety-two was prepared by reacting one mole of trimethylolpropane and six moles of propylene oxide. Twenty-five parts by weight of this polyether was blended with sixty-five parts by weight of the reaction product of two moles of trimethylolpropane and one mole of 1,4,5,6,7,7-hexachlorobicyclo-(2.2.1)-5-heptene-2,3-dicarboxylic acid condensed to an acid number of below ten and having a hydroxyl number of three hundred and sixty-five and ten parts by weight of an equimolar mixture of mono- and dibutyl phosphate.

(B) To two hundred grams of the resin prepared in Example 7(A) at forty-five degrees centigrade was added a solution of (1) sixty grams of trichlorofluoromethane and (2) two hundred grams of the reaction product of five hundred and ninety-three grams of 1,4,5,6,7,7-hexachlorobicyclo-(2.2.1)-5-heptene-2,3-dicarboxylic acid, and one thousand, three hundred and ninety-two grams of a commercial mixture of eighty percent 2,4-tolylene diisocyanate and twenty percent 2,6-tolylene diisocyanate, said reaction product (2) reacted between eighty and one hundred and twenty degrees centigrade. The mixture was stirred rapidly for thirty seconds, and poured into a mold. The resultant foam was cured for fifteen minutes at seventy-five degrees centigrade, and found to have the following properties:

| | |
|---|---|
| Density | 2.3 p.c.f. |
| Compressive yield at 25° C. | 32 p.s.i. |
| Burning rate ASTM D-757 | 0.33 in./min. |
| Humidity aging (one month at 70° C. and 100% RH) | 5 percent expansion. |
| Dry heat aging (one month at 100° C.) | 5 percent expansion. |

EXAMPLE 8

A polyether having a hydroxyl number of two hundred and forty and a Gardner viscosity at fifty degrees centigrade of about fifteen seconds was produced by first reacting a mixture of three hundred grams phenol, with one hundred and ten grams of thirty-seven percent formaldehyde solution in the presence of 1.5 grams oxalic acid and 0.5 gram of dioctyl sulfosuccinate followed by reacting the resulting resinous product with two hundred and forty grams ethylene oxide using 0.5 gram of NaOH as catalyst. This polyether is used in the manner of Example 7 to produce a low density polyurethane foam.

EXAMPLE 9

(A) A polyester having an acid number of less than one and a hydroxyl number of five hundred and four was prepared by reacting five moles of trimethylolpropane and three moles of adipic acid. Two hundred grams of this polyester was blended with two hundred grams of a polyester comprising 7.6 moles of glycerine, four moles of adipic acid and two moles of 1,4,5,6,7,7-hexachlorobicyclo-(2.2.1)-5-heptene-2,3-dicarboxylic acid cooked to an acid number of five and having a hydroxyl number of two hundred and sixty-five, and forty grams of an equimolar mixture of monobutyl and dibutyl acid phosphates at sixty degrees centigrade. The temperature was dropped to forty-five degrees centigrade and a solution of four hundred and thirty-five grams of semi-prepolymer and seventy grams of trichlorofluoromethane was added with rapid stirring. The semi-prepolymer was prepared from twenty-five parts of the above-mentioned chlorine-containing polyester and seventy-five parts of a commercial mixture of eighty percent 2,4-tolylene diisocyanate and twenty percent 2,6-tolylene diisocyanate. After one minute the mixture was poured into a mold and permitted to expand and cure at room temperature. The foam had excellent physical properties comparable to those in Example 7, had good cell structure and was self-extinguishing.

EXAMPLE 10

An alkyd resin was prepared by mixing 182.5 grams of 2,3-dimethylol-1,4,5,6,7,7-hexachlorobicyclo-(2.2.1)-5-heptene, ninety-two grams of glycerol and one hundred and sixty two grams of phthalic anhydride and heating the mixture to one hundred and fifty degrees centigrade in the presence of toluene. At the completion of the reaction the toluene was removed by vacuum distillation.

An additional thirty grams of glycerol is added to the adduct, followed by four hundred grams of toluene diisocyanate and the mixture is held at sixty degrees centigrade until it becomes compatible. A foaming agent comprising forty milliliters of a mixture of ten parts tertiary amyl alcohol and one part concentrated sulfuric acid is added to the polymer mixture, which is held for two minutes and poured into a mold. The mixture is expanded and cured at one hundred and twenty degrees centigrade for two hours, producing a strong, low density foam.

EXAMPLE 11

An alkyd resin is prepared by heating together 2.5 moles of trimellitic anhydride, three moles of 2,3-dimethylol - 1,4,5,6,7,7-hexachlorobicyclo-(2.2.1)-5-heptene and 4.5 moles of ethylene glycol to produce a polymer having an acid number of six and a hydroxyl number of two hundred and fifty-two. To a hot mixture of forty grams of this alkyd, 0.3 gram of Emulphor EL-719 and eight grams of glycerol is added 45.2 grams of toluene diisocyanate in two parts. The mixture is stirred until all components are compatible and then cooled to about sixty degrees centigrade. A solution of six drops of concentrated sulfuric acid and 4.4 cc. of tertiary amyl alcohol is added to the mixture which is then stirred until it is white and creamy. The resulting mixture is poured at eighty degrees centigrade into a mold, and thereafter expanded and cured for one hour at one hundred and twenty degrees centigrade. The product is a low density foam having a fine cell structure.

Other tricarboxylic compounds that can be used in the manner of Example 11 are trimellitic acid, and tricarballylic acid and anhydride.

While our invention has been described with reference to certain specific embodiments, it will be recognized by those skilled in the art that many variations are possible without departing from the spirit and scope of the invention.

We claim:

1. A polyurethane composition produced by reacting components comprising (I): a mixture comprised of (A) an alkyd resin selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof, and (B) a low molecular weight polyether having at least three hydroxyl groups per molecule and a hydroxyl number in the range of 200 to 950; and (II) an organic polyisocyanate.

2. The composition of claim 1 wherein the adduct of hexahalocyclopentadiene and a polycarboxylic compound is 1,4,5,6,7,7-hexachlorobicyclo-(2.2.1)-5-heptene-2,3-dicarboxylic acid.

3. The composition of claim 2 wherein the polyether is the reaction product of trimethylol propane and propylene oxide.

4. The composition of claim 2 wherein the polyether is the reaction product of a phenol-formaldehyde resin and ethylene oxide.

5. A fire-resistant, cellular reaction product which is produced by reacting (I) a composition comprising a mixture of (A) an alkyd resin selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof, and (B) a low molecular weight polyether having at least three hydroxyl groups per molecule and a hydroxyl number in the range of 200 to 950; with (II) an organic polyisocyanate, in the presence of (III), a foaming agent.

6. The cellular reaction product of claim 5 wherein the adduct of hexahalocyclopentadiene and a polycarboxylic compound is 1,4,5,6,7,7 - hexachlorobicyclo-(2.2.1)-5-heptene-2,3-dicarboxylic acid.

7. The cellular reaction product of claim 5 wherein the polyether is the reaction product of trimethylol propane and propylene oxide.

8. The cellular reaction product of claim 5 wherein the polyether is the reaction product of a phenol-formaldehyde resin and ethylene oxide.

9. The cellular reaction product of claim 5 wherein the foaming agent is a fluorochlorocarbon boiling in the range of 20 to 50 degrees centigrade.

10. The cellular reaction product of claim 9 wherein the fluorochlorocarbon is trichlorofluoromethane.

11. The method for producing a polyurethane foam which comprises reacting (I) a mixture comprised of (A) an alkyd resin containing an adduct of hexahalocyclopentadiene wherein the halogen is selected from a group consisting of fluorine, chlorine, bromine and mixtures thereof, and (B) a low molecular weight polyether having at least three hydroxyl groups per molecule, a hydroxyl number in the range of 200 to 950, a viscosity of less than 100 Gardner seconds at 50 degrees centigrade, and which is capable of reacting with an isocyanate, with (II) an organic polyisocyanate, in the presence of (III) a foaming agent.

12. The method of claim 11 wherein the foaming agent is a fluorochlorocarbon boiling in the range of 20 to 50 degrees centigrade.

13. The method of claim 12 wherein the fluorochlorocarbon is trichlorofluoromethane.

14. The method of claim 11 wherein the alkyd resin is selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof.

15. The method of claim 14 wherein the polyether is the reaction product of trimethylol propane and propylene oxide.

16. The method of claim 14 wherein the polyether is the reaction product of a phenol-formaldehyde resin and ethylene oxide.

17. A polyurethane composition produced by reacting components comprising (I) a mixture comprised of (A) an alkyd resin comprised of the reaction product of (a) an adduct of hexahalocyclopentadiene and a polycarboxylic compound containing aliphatic carbon-to-carbon unsaturation, wherein the halogen is selected from the group consisting of chlorine, fluorine, bromine and mixtures thereof, and (b) a polyhydric alcohol containing at least three hydroxyl groups; and (B) a low molecular weight polyether having at least three hydroxyl groups per molecule and a hydroxyl number in the range of 200 to 950; and (II) an organic polyisocyanate.

18. The polyurethane composition of claim 17 wherein the polyether is the reaction product of trimethylol propane and propylene oxide.

19. The polyurethane composition of claim 17 wherein the polyether is the reaction product of a phenol-formaldehyde resin and ethylene oxide.

20. A fire-resistant, cellular reaction product produced by reacting a composition comprising (I) a mixture comprised of (A) an alkyd resin comprised of the reaction product of (a) an adduct of hexahalocyclopentadiene and a polycarboxylic compound containing aliphatic carbon-to-carbon unsaturation, wherein the halogen is selected from the group consisting of chlorine, fluorine, bromine and mixtures thereof, and (b) a polyhydric alcohol containing at least three hydroxyl groups; and (B) a low molecular weight polyether having at least three hydroxyl groups per molecule and a hydroxyl number in the range of 200 to 950; (II) an organic polyisocyanate; and (III) a foaming agent.

21. The cellular reaction product of claim 20 wherein the polyether is the reaction product of trimethylol propane and propylene oxide.

22. The cellular reaction product of claim 20 wherein the polyether is the reaction product of a phenol-formaldehyde resin and ethylene oxide.

References Cited by the Examiner

UNITED STATES PATENTS

| | | | |
|---|---|---|---|
| 2,811,493 | 10/57 | Simon et al. | 260—2.5 |
| 2,959,242 | 11/60 | Muller et al. | 260—2.5 |
| 2,962,183 | 11/60 | Rill et al. | 260—2.5 |
| 3,054,760 | 9/62 | Worsley et al. | 260—2.5 |
| 3,106,537 | 10/63 | Simon et al. | 260—2.5 |

FOREIGN PATENTS 562,499   12/57   Belgium.

OTHER REFERENCES

Barringer: "Rigid Urethane Foams–11 Chemistry and Formulation," Du Pont Elastomer Chem. Dept. Bulletin H.R.–26; April 1958, 56 pages; pages 26, 30, 38 and 39 relied upon.

LEON J. BERCOVITZ, *Primary Examiner.*

DONALD ARNOLD, DONALD E. CZAJA, *Examiners.*